(12) United States Patent
Ghebru et al.

(10) Patent No.: US 10,160,345 B2
(45) Date of Patent: Dec. 25, 2018

(54) METHOD FOR OPERATING A MOTOR VEHICLE AND MOTOR VEHICLE

(71) Applicant: AUDI AG, Ingolstadt (DE)

(72) Inventors: Daniel Ghebru, Ingolstadt (DE); Klaus Strasser, Eichstätt (DE); Alois Stauber, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 15/616,211

(22) Filed: Jun. 7, 2017

(65) Prior Publication Data

US 2017/0355273 A1   Dec. 14, 2017

(30) Foreign Application Priority Data

Jun. 8, 2016   (DE) ........................ 10 2016 210 066

(51) Int. Cl.
*H02P 3/14* (2006.01)
*H02P 3/18* (2006.01)
*B60L 11/18* (2006.01)
*B60L 7/10* (2006.01)
*B60L 11/12* (2006.01)
(Continued)

(52) U.S. Cl.
CPC ............... *B60L 11/189* (2013.01); *B60L 7/10* (2013.01); *B60L 11/123* (2013.01); *B60L 11/1887* (2013.01); *B60W 10/08* (2013.01); *B60W 10/26* (2013.01)

(58) Field of Classification Search
CPC ............. Y02T 10/7005; Y02T 10/7022; Y02T 10/6217; Y02T 10/705; Y02T 10/7077; Y02T 10/92; Y02T 10/6278; Y02T 10/645; Y02T 10/7044; Y02T 10/7061;
(Continued)

(56) References Cited

U.S. PATENT DOCUMENTS 5,861,724 A * 1/1999 Ackerson ............... B60L 7/006
                                                318/139
7,600,391 B2 * 10/2009 Naik .................... B60H 1/3208
                                                62/238.6
(Continued)

FOREIGN PATENT DOCUMENTS

DE   102012004008 A1   9/2012
DE   102011017678 A1   10/2012
(Continued)

OTHER PUBLICATIONS

German Office Action dated Mar. 27, 2017 of corresponding application No. DE10 2016 210 066.1; 7 pgs.

*Primary Examiner* — Erick Glass
(74) *Attorney, Agent, or Firm* — Maier & Maier, PLLC

(57) ABSTRACT

A method for operating a motor vehicle, which is driven by an electric motor. The motor vehicle has a high-voltage power system, to which the electric motor is connected, with a high-voltage battery that is operated in an operating temperature range, for which purpose, a temperature control mechanism utilizing a circulating coolant, and having a heating mechanism for the coolant and a cooling mechanism for the coolant is assigned to the high-voltage battery, to satisfy a power deficiency which indicates that a braking power required by recuperation of the electric motor exceeds the on-demand power currently in the high-voltage power system that can be demanded for charging the high-voltage battery.

6 Claims, 2 Drawing Sheets

Figure 1:
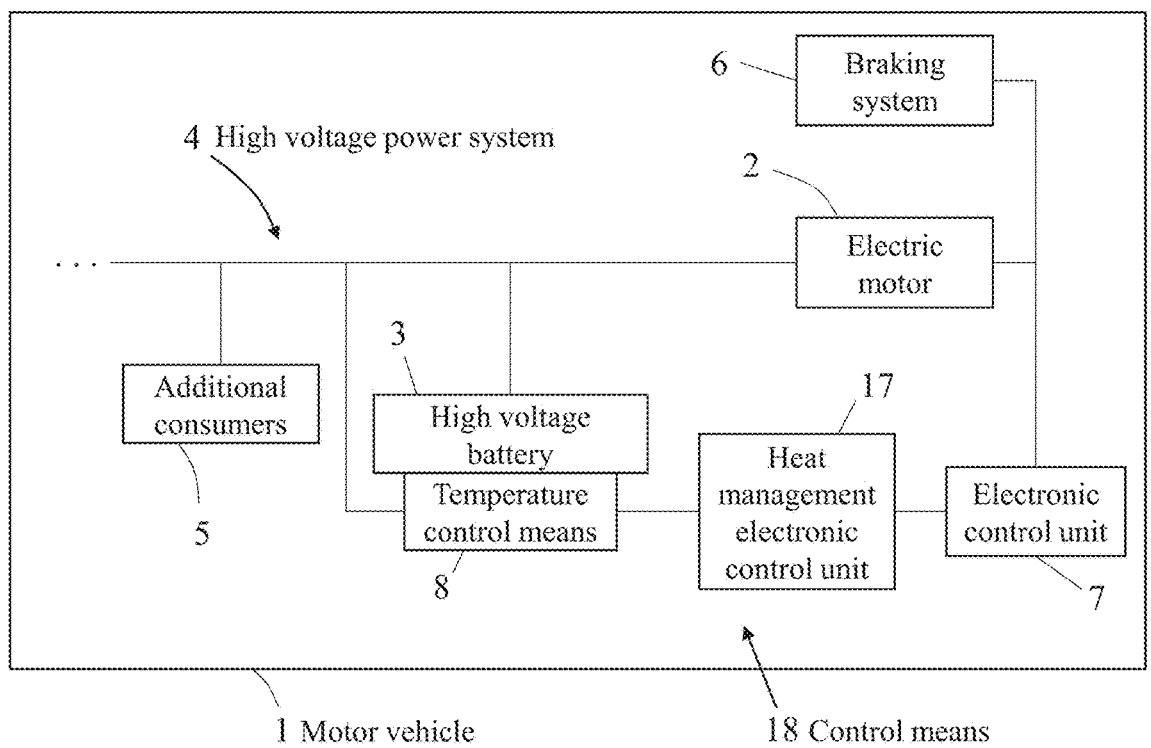

(51) Int. Cl.
*B60W 10/08* (2006.01)
*B60W 10/26* (2006.01)

(58) Field of Classification Search
CPC ............... Y02T 10/648; Y02T 10/7066; Y02T 10/7083; Y02T 10/72; B60L 11/189; B60L 7/10
USPC ....................................................... 318/376
See application file for complete search history.

(56) References Cited

U.S. PATENT DOCUMENTS

| | | | | |
|---|---|---|---|---|
| 7,798,267 | B2* | 9/2010 | Winkler | B60K 6/28 180/65.285 |
| 8,245,801 | B2* | 8/2012 | Flett | B60K 6/46 180/65.21 |
| 9,126,498 | B2* | 9/2015 | Weβ | B60W 50/0097 |
| 2004/0263099 | A1* | 12/2004 | Maslov | B60L 11/126 318/400.24 |
| 2005/0052080 | A1* | 3/2005 | Maslov | B60L 8/00 307/10.1 |
| 2006/0053814 | A1* | 3/2006 | Naik | B60H 1/004 62/241 |
| 2007/0272116 | A1* | 11/2007 | Bartley | B60L 7/22 105/35 |
| 2008/0122409 | A1* | 5/2008 | Winkler | B60K 6/28 322/36 |
| 2010/0100266 | A1* | 4/2010 | Yoshinori | B60K 1/04 701/22 |
| 2010/0133025 | A1* | 6/2010 | Flett | B60K 6/46 180/65.22 |
| 2010/0299036 | A1* | 11/2010 | Vespasien | B60L 7/18 701/70 |
| 2011/0100735 | A1* | 5/2011 | Flett | B60K 6/46 180/65.22 |
| 2012/0022735 | A1* | 1/2012 | Tashiro | B60L 7/18 701/22 |
| 2014/0365075 | A1* | 12/2014 | We | B60W 50/0097 701/36 |
| 2015/0298553 | A1* | 10/2015 | Maiterth | B60L 3/10 701/71 |

FOREIGN PATENT DOCUMENTS

| | | |
|---|---|---|
| DE | 102013205314 A1 | 10/2014 |
| DE | 102013009732 A1 | 12/2014 |
| DE | 102013012164 A1 | 1/2015 |
| DE | 102013013258 A1 | 2/2015 |
| EP | 2154016 A1 | 2/2010 |

* cited by examiner

METHOD FOR OPERATING A MOTOR VEHICLE AND MOTOR VEHICLE

FIELD

The invention relates to a method for operating a motor vehicle, which is driven only by an electric motor, at least temporarily, wherein the motor vehicle has a high-voltage power system, to which the electric motor is connected, with a high-voltage battery that is to be operated in an operating temperature range, for which reason a temperature control means utilizing a circulating coolant and comprising a heating means for the coolant and a cooling means for the coolant is assigned to the high-voltage battery. In addition, the invention relates to a motor vehicle, in which the method can be conducted.

BACKGROUND

Motor vehicles that use an electric motor as a drive engine or a traction engine have already been proposed in the prior art. On the one hand, so-called hybrid motor vehicles are known, in which a combustion engine is also present and a purely electrical operation is provided only temporarily. On the other hand, however, there exist all-electric vehicles that are also called battery electric vehicles (BEV). Whereas conventional braking systems of motor vehicles utilize the drag power of the combustion engine for slowing down the motor vehicle, in the case of all-electric vehicles or also in motor vehicles that are purely electrically operated only temporarily, the drag power of the combustion engine ceases to exist, without replacement. In this case, it has been proposed to compensate for this lack of possibility for slowing down by recuperation from the electric motor. Therefore, in this case, the electric motor is operated by a generator and feeds electrical power into the on-board high-voltage system, which can be utilized, for example, in order to charge a high-voltage battery for supplying the on-board high-voltage system, and also to satisfy the power requirement of other consumers that are connected to the on-board high-voltage system of the motor vehicle, for example, the compressors of air-conditioning systems. Here, for example, a voltage equal to or greater than 48 V can be understood as high voltage.

If, however, the motor vehicle is found in a state in which no electrical power or clearly less electrical power than the demanded braking power required in the on-board high-voltage system, thus, for example, when the high-voltage battery is almost completely charged or is completely charged, the possibility of providing braking power by recuperation is eliminated, at least partially or even completely.

Consequently, since the possibility of recuperation cannot be ensured in the known at least temporarily purely electrically operated motor vehicles, and in particular all-electric vehicles, a sufficient braking power would be ensured only by a larger dimensioned braking system and/or a more complex brake cooling. Larger dimensioned braking systems entail higher costs as well as a heavier vehicle weight, so that, in turn, the entire vehicle efficiency is negatively influenced. Also, the tire scheme is limited. A complex brake cooling is also accompanied by higher costs. Additional brake cooling channels also increase the air resistance coefficient ($c_w$ value), which leads to higher electrical consumption and thus to a lower total vehicle efficiency, and finally to shorter travel ranges.

SUMMARY

The object of the invention is thus to provide a possibility that is as simple as possible for ensuring the presence of recuperation on-demand power for a braking system in a motor vehicle that is operated at least temporarily purely electrically.

In order to achieve this object, in the case of a method of the type named initially, it is provided according to the invention that in order to satisfy a deficiency criterion for power requirement, which indicates that a braking power required for braking the motor vehicle via recuperation by means of the electric motor currently exceeds the on-demand power that may be necessary in the high-voltage power system for charging the high-voltage battery and/or required by additional consumers, the heating means and the cooling means of the temperature control means for the high-voltage system are controlled in such a way that both will operate, and they require at least the power difference between the braking power and the on-demand power, and the temperature of the high-voltage battery remains within the operating temperature range.

Therefore, the invention proposes to use a recuperation strategy that permits—under all conditions—compensating for the insufficient braking power not covered by the power requirement in the on-board high-voltage system, as long as the motor vehicle is found in a state with a fully charged high-voltage battery and also there is a very small power requirement for other consumers in the high-voltage power system, so that a conventional recuperation in principle would not be possible. It is proposed for this to simultaneously operate two consumers that are present and have opposing effects, without anything further, so that a power sink arises as an additional power requirement that has no influence or at least a negligible influence, however, on the remaining operation of the motor vehicle. A larger dimensioned braking system with its accompanying disadvantages can be dispensed with in this way.

Here, the fact is utilized that the operating temperature range of the high-voltage battery is usually limited both at the bottom as well as at the top. Consequently, in the corresponding temperature control means, usually both a heating means as well as a cooling means are present, so that the coolant can be both heated and cooled. Now an additional braking torque via the electric motor can be represented thereby, which compensates for the missing drag power of an internal combustion engine, so as to satisfy the deficiency criterion for power requirement, if the electrical consumption in the high-voltage power system is increased at least by the same amount of power that cannot be demanded in another way, so that a recuperation via the electric motor can in general first become possible in the case of an insufficient power requirement.

However, since the temperature control means for the high-voltage battery provides two high-voltage consumers, namely the heating means and at least indirectly the cooling means, which can generate a high electrical consumption, these high-voltage consumers are actuated, in particular via a heat management control system, in order to demand a deficient braking power. If the motor vehicle recognizes, in order to satisfy the deficiency criterion for power requirement, thus, for example, in the case of a completely charged high-voltage battery in combination with a longer actuation of the brake pedal, which could indicate travel downhill, that it is found in a condition of deficient braking power, the heat management of the high-voltage battery that is present can be used for the purpose of heating the coolant via the heating means in order to again simultaneously cool it down via the cooling means. For this purpose, both the heating means as well as the cooling means, or a component associated with the cooling means consume electrical power, which leads to an increased electrical consumption, which in turn makes possible an increased braking power as a consequence of the recuperation operation of the electric motor.

In this case, it is preferred, within the scope of the present invention, if, when satisfying the deficiency criterion for power requirement, the cooling power of the cooling means and the heating power of the heating means are increased in such a way that the temperature of the coolant remains at least essentially constant. In this case, the cooling power and the heating power in the final analysis are mutually cancelled, so that the high-voltage battery does not experience any external change in the temperature of the coolant. In this way, a power sink is created, which does not influence any other operation of the motor vehicle, but offers a target for recuperation power generated by the electric motor in the generator mode.

In this case, however, an exact maintaining of the temperature of the coolant or a trend that is currently being carried out without anything further is not necessary, as long as, in addition, the temperature of the coolant changes reliably only in the operating temperature range. Therefore, it can also be provided that, in order to satisfy the deficiency criterion for power requirement, the cooling power of the cooling means and the heating power of the heating means will be increased in such a way that a change in the temperature of the coolant will lie only within the operating temperature range. If the cooling power is less than the heating power, the coolant temperature will increase continually and in this case delivers heat to the high-voltage battery. The high-voltage battery that is extensively unloaded at this point in time will absorb the heat, heat up and serve as a heat storage reservoir in this operating state, due to its very large heat capacity. If the cooling power is greater than the heating power, the coolant temperature continually decreases, so that the high-voltage battery is deprived of heat. Based on the very high heat capacity of the high-voltage battery, it is extremely improbable that the minimum admissible operating temperature of the high-voltage battery would be reached. If, upon starting up, the high-voltage battery should already be at almost the minimum admissible operating temperature, this can only be the case with very low ambient temperatures or external temperatures, whereby, however, in the case of very low ambient temperatures, for the most part an increased power demand is present in the high-voltage power system without anything further, due to the climate control of the interior space.

It can also be provided, however, to integrate the additional activation of the heating means and the cooling means into the usual control operation for the coolant temperature, so that, for example, it can be provided that an average temperature of the operating temperature range and/or a pre-determined ideal temperature of the high-voltage battery is regulated by the change in the temperature of the coolant. In this case, in particular, an optimization of the cooling operation and the temperature of the coolant proceeding via the usual heat management system will be pursued, which is otherwise omitted, depending on the particular case, in order to avoid too high a power demand by the temperature control means. Consequently, the additionally resulting power requirement in the on-board high-voltage system for consuming recuperation power can also be conveyed, at least in part, to a specific target.

An appropriate enhancement of the invention provides that the activation of the heating means and the cooling means in order to satisfy the deficiency criterion for power requirement is produced additionally as a function of a measured external temperature. In this case, it can be provided, in particular, that in the case of an external temperature that goes below a certain threshold value, the heating means and the cooling means are operated to bring about an increasing change in the temperature of the coolant if the deficiency criterion for power requirement has been satisfied. In this way, even in the case of low external temperatures and temperatures of the high-voltage battery close to the minimum admissible operating temperature, any moving to outside the operating temperature range can be reliably avoided.

The external temperature of the motor vehicle, however, can also play a role in another respect, since lastly, it can determine the power requirement of a climate-control means of the motor vehicle, whose air-conditioning compressor is also often connected to the high-voltage power system of the motor vehicle. In other words, it can be said that, as a function of the external temperature, a continuous balancing can be produced between the high-voltage power system requirement via the climate control and the additionally necessary electrical consumption by way of the activation of the heating means and the cooling means for simultaneous operation, so that at any time point, the deficient mechanical braking power can be compensated for via the recuperation operation of the electric motor with the help of corresponding regulation. If additional consumers should be connected to the high-voltage system, of course, their power demand can also be taken into consideration, so that the method according to the invention in this sense always mitigates the difference between any required braking power by recuperation and the power demand present in the on-board high-voltage system due to the consumers and/or the battery, without anything further. Thus, ideally, the operation of the cooling means and the heating means in order to satisfy the deficiency criterion for power requirement is controlled in such a way that it is precisely this difference that is compensated for and no superfluous power is consumed. Furthermore, a transforming means can also be viewed as a consumer, in particular a d.c. voltage transformer, which permits the exchange of energy between the high-voltage power system of the motor vehicle and a low-voltage power system of the motor vehicle having a lower operating voltage than the high-voltage power system. Such a low-voltage power system is provided without anything further in most motor vehicles, and it supplies, for example, the usual 12-volt motor vehicle components.

A resistance heater and/or a PTC element can be used as a heating means, and/or a heat exchanger coupled to an evaporator of a cold circuit having a compressor can be used as a cooling means. Of course, other concrete configurations are also conceivable. If a cooling circuit is to be used, the compressor therein is the component that determines the power consumption. In particular, in several exemplary embodiments, the cooling circuit of an air-conditioning means of the motor vehicle that is present can also be utilized as the cooling circuit for the heat exchanger, without anything further. Then, also without anything further, the compressor corresponds to the air-conditioning compressor connected to the high-voltage power system.

The activation of the cooling means and of the heating means can be provided appropriately via a heat management electronic control unit designed for the operation of the temperature control means. For example, an overriding electronic control unit may be present, which determines the difference between the existing power demand and also a possible charging requirement for the battery in the high-voltage power system and the required braking power by recuperation. If such a difference is indicated in the sense of a deficiency requirement, the corresponding difference value is passed along to the heat management electronic control unit, where a corresponding activation of the heating means and of the cooling means is produced in order to provide the deficient power requirement. The overriding electronic control unit can be, for example, an energy management electronic control unit, a braking electronic control unit and/or a general drive electronic control unit.

In addition to the method, the invention also relates to a motor vehicle, especially an all-electric vehicle, having an electric motor as a drive engine; a high-voltage power system to which the electric motor is connected, with a high-voltage battery that is to be operated in an operating temperature range; a temperature control means utilizing a circulating coolant, having a heating means for the coolant and a cooling means for the coolant, and assigned to the high-voltage battery; and a control means designed for implementing the method according to the invention. All of the embodiments relative to the method according to the invention can be transferred analogously to the motor vehicle according to the invention, so that the already named advantages can also be obtained with the latter.

BRIEF DESCRIPTION

Figure 2:
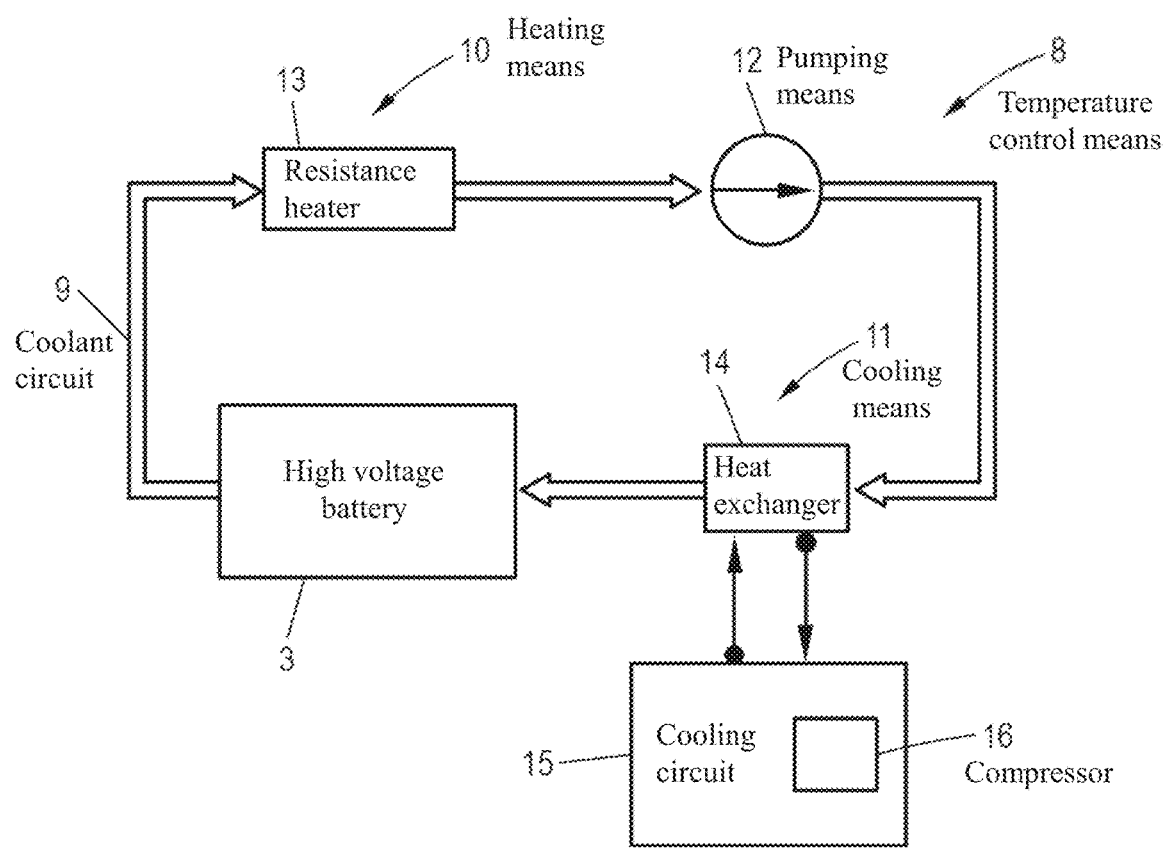

Additional advantages and details of the present invention result from the examples of embodiment described in the following, as well as based on the drawings. Here:

FIG. 1 shows a schematic diagram of a motor vehicle according to the invention; and FIG. 2 shows the coolant circuit of a temperature control means for a high-voltage battery.

DETAILED DESCRIPTION

FIG. 1 shows a schematic diagram of a motor vehicle 1 according to the invention, which is presently designed as an all-electric vehicle. This means that the motor vehicle 1 has an electric motor 2 as a single drive motor, which is presently designed as an electric engine; hence, it can also be utilized in a generator operation. For supplying the electric motor, a high-voltage battery 3 is provided, which is connected to the electric motor 2 via the high-voltage power system 4 of the motor vehicle 1, and with generator operation of the electric motor 3, can also be charged from the latter. Additional consumers 5 can also be connected to the high-voltage power system 4, for example, an air-conditioning compressor of a climate-control means. Another conceivable consumer 5 is a d.c. voltage transformer that permits an energy exchange between the high-voltage power system 4 and a low-voltage power system, which is not shown in the detail here, the operating voltage of which is lower than that of the high-voltage power system.

The electric motor can also be actuated by a braking system 6 or an electronic control unit 7 associated with it, in order to provide a specific braking power by recuperation. In the case of recuperation, the energy of motion of the motor vehicle 1 is utilized in order to generate electrical recuperation power during the generator operation of the electric motor 2, this recuperation power being supplied to the high-voltage power system. The recuperation power can be utilized in order to charge the high-voltage battery 3 and/or to cover the power requirement of the consumers 5.

If, however, there exists a difference between the on-demand power in the high-voltage power system that is needed by the consumers 5 and can be used for charging the high-voltage battery 3 and the required braking power of the electric motor 2, for example, since the high-voltage battery 3 is already completely or almost completely charged, a recuperation would not be basically possible, since the recuperation power or braking power that arises cannot be drawn off.

This problem is solved in the motor vehicle 1 in that a power sink is created in a special component of the motor vehicle 1, which appropriately has components that are opposite in their effect and that can therefore generate a power requirement without influencing any other operation of the motor vehicle.

Consequently, the high-voltage battery 3 shall be operated in a specific, predetermined operating temperature range. This range has a minimum operating temperature and a maximum operating temperature, so that a temperature control means 8, which is associated with the battery 3, as is shown in more detail in FIG. 2, has, in a coolant circuit 9, both a heating means 10 for heating the coolant as well as a cooling means 11 for cooling the coolant. The temperature control means overall, but concretely the heating means 10 and the cooling means 11, in this case are also consumers in the high-voltage power system 4.

In the concretely illustrated case, the temperature control means 8 also has a pumping means 12 in the coolant circuit 9, and the heating means 10 is designed as a resistance heater 13. Alternatively, for example, a PTC element is also conceivable. The cooling means 11 comprises a heat exchanger 14 that is coupled to a cooling circuit 15, which is only schematically shown here, and is concretely the evaporator. The cooling circuit 15, as is known basically, has a compressor 16, by way of which the power requirement of the cooling means 11 develops in the present case.

The operation of the temperature control means 8 is controlled by a heat management electronic control unit 17.

Now, the electronic control unit 7, for example, an electronic drive control unit, and the heat management electronic control unit 17 presently form a control means 18 that is designed for implementing the method according to the invention. The electronic control unit 7, which can be connected in communication, for example, to an energy management electronic control unit (not shown) for this purpose, determines the on-demand power in the high-voltage power system 4, which, of course, also comprises a maximum possible charging power in the high-voltage battery 3, even if this is not explicitly currently required. It is then examined by a deficiency criterion for power requirement whether a braking power which is to be generated by recuperation is greater than the on-demand power in the high-voltage power system 4. If this deficiency criterion for power requirement is to be satisfied, the difference value between the braking power and the on-demand power is passed on to the heat management electronic control unit 17, which generates an additional power requirement by activating the heating means 10 and the cooling means 11 of the temperature control means 8, which, on the one hand, at least covers this difference value, but nevertheless, on the other hand, takes care that the temperature of the high-voltage battery 3 is maintained within the operating temperature range. For this purpose, both the heating means 10 as well as the cooling means 11 are operated in order to keep the temperature of the coolant as constant as possible. This means concretely that the coolant is first heated via the resistance heater 13, in order to then be cooled down again in the heat exchanger 14 (also often called the "chiller"). In this case, both the heating means 10 as well as the cooling means 11, concretely the compressor 16, must take up an electrical power that leads to an increased electrical consumption and thus to an increased on-demand power in the high-voltage power system 4, which makes possible an increased braking power as a consequence of the recuperation operation of the electric motor 2.

Maintaining the temperature of the coolant constant need not be conducted highly precisely in this case, since a slight heating or cooling is usually not critical. If the coolant temperature should increase, the high-voltage battery 3, which is unloaded to a great extent, absorbs the heat, which is not a problem due to the high heat capacity of the high-voltage battery 3. On the other hand, when there is a decrease in the coolant temperature, thus when the cooling power is greater than the heating power, due to the very high heat capacity of the high-voltage battery 3, one only need fear a slow cooling, so that the minimum admissible operating temperature is for the most part not reached. In the case of extremely low outside temperatures, it can be ensured that the heating power is greater than the cooling power.

It should be pointed out that configurations of the method according to the invention are also possible, in which different cooling and heating powers are used in a targeted manner, in order to obtain, for example, a fine regulation of the temperature of the coolant at an ideal temperature or a mean temperature of the operating temperature range.

In any case, it is permitted to generate an additional demand in the high-voltage power system 4 that serves as a power sink for the braking power of the electric motor 2 that develops in the case of recuperation.

The invention claimed is:

1. A method for operating a motor vehicle, which is driven only by an electric motor, wherein the motor vehicle has a high-voltage power system, to which the electric motor is connected, with a high-voltage battery that is to be operated in an operating temperature range, for which purpose, a temperature control means utilizing a circulating coolant and having a heating means for the coolant and a cooling means for the coolant is assigned to the high-voltage battery, comprising:
    determining, by an electronic control unit, an on-demand power in the high-voltage power system;
    examining, by the electronic control unit, a deficiency criterion for a power requirement based on a difference between the on-demand power and a braking power which is to be generated by recuperation of the electric motor;
    satisfying the deficiency criterion for the power requirement,
    wherein the deficiency criterion is satisfied by activating the heating means and the cooling means of the temperature control means for the high-voltage battery so that the temperature of the high-voltage battery remains within the operating temperature range.

2. The method according to claim 1,
    wherein for satisfying the deficiency criterion for the power requirement, the cooling power of the cooling means and the heating power of the heating means are increased in such a way that the temperature of the coolant remains constant, and in such a way that a change in the temperature of the coolant occurs that lies within the operating temperature range.

3. The method according to claim 2,
    wherein an average temperature of the operating temperature range and a predetermined
    ideal temperature of the high-voltage battery is regulated by the change in the temperature of the coolant.

4. The method according to claim 1,
    wherein the activation of the heating means and the cooling means results when the deficiency criterion for the power requirement is satisfied additionally as a function of a measured external temperature.

5. The method according to claim 1,
    wherein a resistance heater or a PTC element is used as the heating means and a heat exchanger coupled to an evaporator of a cooling circuit with a compressor is used as the cooling means.

6. The method according to claim 1,
    wherein the cooling means and the heating means are activated via a heat management electronic control unit designed for the operation of the temperature control means.

* * * * *